United States Patent
Erler et al.

(10) Patent No.: US 7,272,942 B2
(45) Date of Patent: Sep. 25, 2007

(54) METHOD AND SYSTEM FOR PURIFYING EXHAUST GAS

(75) Inventors: Hans Erler, Hattingen (DE); Peter Zollner, Castrop-Rauxel (DE); Klaus Hermanns, Hunxe (DE); Norbert Hagenbruck, Oberhausen (DE)

(73) Assignee: Air Products and Chemicals, Inc., Allentown, PA (US)

( * ) Notice: Subject to any disclaimer, the term of this patent is extended or adjusted under 35 U.S.C. 154(b) by 305 days.

(21) Appl. No.: 10/833,641

(22) Filed: Apr. 28, 2004

(65) Prior Publication Data

US 2004/0261451 A1 Dec. 30, 2004

(30) Foreign Application Priority Data

Apr. 30, 2003 (EP) .................. 03008895

(51) Int. Cl.
F25B 1/00 (2006.01)
F25B 43/00 (2006.01)

(52) U.S. Cl. .............. 62/115; 62/474; 95/99; 95/143

(58) Field of Classification Search .......... 62/474, 62/475, 617, 619, 631, 632, 625, 241, 46.1, 62/111, 115; 95/99, 106, 115, 143
See application file for complete search history.

(56) References Cited

U.S. PATENT DOCUMENTS

| 4,283,212 A * | 8/1981 | Graham et al. ............... 62/636 |
| 5,012,037 A * | 4/1991 | Doshi et al. ................ 585/822 |
| 5,083,440 A | 1/1992 | Karthaus et al. |
| 5,214,924 A | 6/1993 | Karthaus et al. |
| 5,224,359 A | 7/1993 | Karthaus et al. |
| 5,231,772 A | 8/1993 | Hermanns et al. |
| 5,283,035 A * | 2/1994 | Karthaus et al. .............. 422/31 |
| 5,332,492 A * | 7/1994 | Maurer et al. ............. 208/340 |
| 5,472,667 A | 12/1995 | Karthaus et al. |
| 5,669,962 A * | 9/1997 | Dunne ......................... 95/115 |
| 5,783,162 A * | 7/1998 | Tomita et al. .............. 423/348 |
| 5,788,744 A * | 8/1998 | Klobucar et al. ............. 95/113 |
| 5,855,650 A * | 1/1999 | Kalbassi et al. .............. 95/106 |
| 5,891,410 A * | 4/1999 | Modic et al. ............ 423/245.1 |
| 6,077,488 A * | 6/2000 | Jain et al. .................... 423/210 |
| 6,170,264 B1 * | 1/2001 | Viteri et al. .................. 60/671 |
| 6,344,069 B2 * | 2/2002 | Smolarek et al. ............. 95/96 |
| 6,685,839 B1 * | 2/2004 | Corr et al. .................. 210/664 |

FOREIGN PATENT DOCUMENTS

| DE | 4133916 | 4/1993 |
| DE | 19503052 | 8/1996 |
| EP | 0595004 | 9/1993 |
| JP | 60-22042 A * | 2/1985 |

* cited by examiner

Primary Examiner—Mohammad M. Ali

(57) ABSTRACT

The invention relates to a method and system for purifying exhaust gas, especially a solvent-containing exhaust gas from refrigerator recycling, wherein the dried, pressurized exhaust gas is cryogenically condensed, the condensed components are separated from the remaining exhaust gas, the cold and purified pressurized exhaust gas is passed through an adsorber to adsorbe the remaining condensed components, the adsorber is purged with a warmed gas stream, namely either a warmed inert gas stream or the purified exhaust gas respectively at reduced pressure, and the desorbed gas is recycled.

17 Claims, 1 Drawing Sheet

METHOD AND SYSTEM FOR PURIFYING EXHAUST GAS

Figure 1:
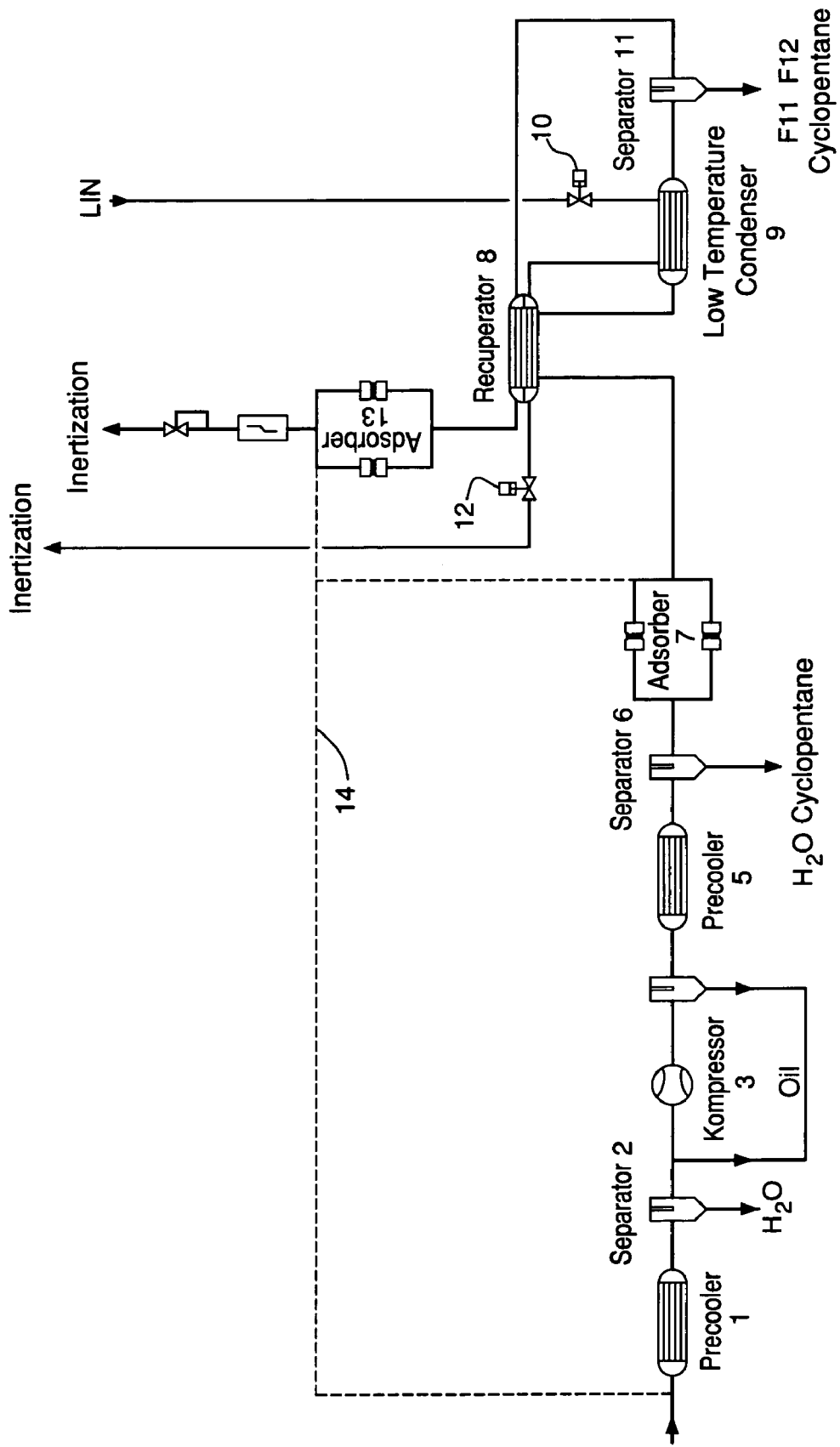

The Invention relates to a method and system for purifying exhaust gas, especially exhaust gas from refrigerator recycling.

The treatment of gas mixtures by separating the mixtures into their constituents is required in many technical fields. Methods and systems for recovering solvents from gas effluents from tape plants are known, for example, from EP-B1-0 491 339, EP-B1-0 491 338, EP-B1-0 417 592 and EP-B1-0 417 591.

Methods and systems for recovering a sterilizing gas from a gas mixture are known from EP-A2-0 516 963, EP-A1-0 543 134 and EP-A1-0 595 004.

A very specific gas purification problem occurs during the recycling of refrigerators which contain—in addition to, the essential refrigerant R12, Butane, which is sucked off in a first step of the refrigerator recycling—propellant gases in the polyurethane (PU) cold isolation foam.

Some years ago fluorocarbons like FCKW R11 were used as an expanding agent for the production of such cold isolation foams. Since 1995 only refrigerators free of FCKW's are produced and usually contain Cyclopentane as a replacement for FCKW.

Medium-sized refrigerators contain approximately 4 kg PU foam with approximately 6 to 7% propellant gas, which is present both in the pores and in the solid matter matrix of the foam.

Refrigerator recycling has the aim to recover valuable materials from the recycled refrigerators, especially ferrous and non-ferrous metals such as ion and copper and plastics like PS and PVC.

During recycling the refrigerator has to be dismantled and the isolation foam will be ground releasing the propellant which has a high ozone depleting potential into the atmosphere.

To purify the exhaust gas from refrigerator recycling, DE-A1-41 33 916 shows a method for separating fluorocarbons from a gas mixture in which the gas mixture is compressed and cooled in at least two stages, in the first cooling stage water containing a smaller amount of fluorocarbons being separated, whereas in the second cooling stage the fluorocarbons are completely liquefied.

In a further development of this method DE-A1-195 03 052 shows a method for condensing adsorbable and desorbable gases, from gas mixtures in which a gas stream containing 0-40% by weight of an adsorbable. and desorbable gas is cooled to a temperature in the range from 0° C. to −50° C. and is guided into a least one adsorption/desorption stage for adsorbing said gases; said adsorption/desorption stage contains a device through which a cooling medium is passed during adsorption; a further gas stream containing 20 to 90% by weight of adsorbable and desorbable gases is passed through a cooling stage in which said gas is almost completely condensed; the gas stream remaining after the condensation is supplied to the adsorption/desorption stage: after reaching the desired loading of the adsorption agent with said gas a heating medium is passed through the device, and additionally warmed gas is passed through said adsorbing agent; finally a gas stream containing desorbed gas is supplied from said adsorption/desorption stage to a cooling stage for condensing the desorbed gas.

Furthermore the applicant has proposed a gas purification system for refrigerator recycling in which the compressed and dewatered exhaust gas is supplied to a cryogenic (low temperature) condenser in which the solvents, especially the fluoro-carbons or cyclopentanes F11/F12 are liquefied so that this liquid can be separated from the gas stream.

One problem of this approach resides in the icing of the cryogenic condenser leading to the possibility that during the de-icing of the heat, exchanger a substantial part of the earlier condensed solvents is vaporized again, contaminating the exhaust gas.

A further problem with the exhaust gas purification systems for refrigerator recycling is the draft for new Regulations of the Federal Environment Authority (Umweltbundesamt) of the Federal Republic of Germany requiring:

A FCKW recovery performance of 283 g FCKW propellant gas/refrigerator, and reducing the emission limit from 150 to <20 mg propellant gas/Nm$^3$ in the exhaust gas.

Worldwide these new requirements constitute the strictest climate protection policy which cannot be fulfilled with conventional exhaust gas purification systems.

It is the object of the present invention to provide a method and a system for purifying exhaust gas, especially from refrigerator recycling, which overcome the above mentioned deficiencies and especially can fulfill the newest Regulations with respect to the emission limit of <20 mg propellant gas/Nm$^3$ in the exhaust gas.

This object is achieved for the method by the features of claim 1 and for the system by the features of claim 10.

Suitable embodiments are defined by the features of the corresponding subclaims.

With the present method/system both the non-combustible. "safe" refrigerant fluoro-carbons R11/R12 as well as the combustible and explosive refrigerant cyclopentane can be removed from the exhaust gas, thereby avoiding the danger of sparking in shredders and mills.

The gas released to the atmosphere from such a system contains less then 10 mg/Nm$^3$ of R11, R12, cyclopentane, R141B thereby fulfilling the newest German requirements. The icing of solvents in the cryogenic condenser can be excluded, and the consumption of liquid nitrogen is minimized. Such Systems can be operated with a consumption of less than 1 kg liquid nitrogen per refrigerator.

The consumption of liquid nitrogen is dependent upon the need for gaseous nitrogen for inertization, i.e. to be used as protective gas to avoid sparking. Due to the use of liquid nitrogen both as a cooling agent, a desorption gas and as an inerting gas the consumption level can be kept low.

The invention will be described with respect to an exemplary embodiment referring to the enclosed drawings, the single FIGURE of which shows a flow scheme for a system for purifying exhaust gas from refrigerator recycling.

The exhaust gas from a recycling plant for refrigerators (not shown) contains in addition to air (oxygen/nitrogen) the expanding agent used for the production of the polyurethane cold isolation foam either FCKW R11/R12 or since 1995 cyclopentane as well as water.

Such an exhaust gas is fed to a precooler 1 cooling the exhaust gas to a temperature below its dewpoint so that a large portion of the moisture (water) present in the exhaust gas condenses. In a following separator 2 the condensed water is separated from the exhaust gas stream, and removed.

The dewatered exhaust gas stream is supplied to an oil-injected screw compressor 3 compressing the exhaust gas stream to a pressure of 2 to 25 bar necessary for the following cryogenic condenser. The recycling oil is used for both cooling and lubricating purposes.

Downstream of the compressor 3 oil is separated in a separator 4, and the removed oil is recycled to the entrance of the compressor 3.

Subsequently the exhaust gas stream is cooled in a second precooler 5, in which the exhaust gas warmed by the compression is cooled again and further moisture (water) is condensed, leading possibly to the formation of ice hydrates in the precooler 5. The condensed water is separated together with the ice hydrates/cyclopentane in a further separator 6 and continuously removed.

The separator 6 is followed by a tandem or redundant molecular sieve adsorber 7 containing two zeolithic molecular sieves connected in parallel. One molecular sieve is in the adsorption phase, whereas the other is in the desorption phase as will be explained later.

The adsorption molecular sieve dries the exhaust gas stream completely as necessary for the following cryogenic condenser 9 to avoid water icing.

The dry exhaust gas from the molecular sieve adsorber 6 is fed to a recuperator 8, a counter-current heat exchanger which is cooled by the low temperature nitrogen gas exiting the cryogenic condenser 9. The exhaust gas cooled in the recuperator 8 is fed to the low temperature or cryogenic condenser 9 to which liquid nitrogen LIN as cooling agent is supplied via a valve 10.

Due to the temperature of the liquid nitrogen the exhaust gas is cooled in the cryogenic condenser 9 to a temperature in which the solvent present in the exhaust gas, namely the fluorocarbons and/or cyclopentane, are condensed completely or almost completely without freezing due to the process pressure aided by the special design of this low temperature condenser as described in EP-B1-417 592.

Such a low temperature condenser 9 comprises in the lower shellside part of a lying shell and tube heat exchanger a liquid intermediate refrigerant. This low temperature condenser 9 contains a first heat exchanger in which said evaporated intermediate refrigerant will be recondensed against liquid or evaporizing liquid nitrogen. A second heat exchanger is cooled by said intermediate refrigerant for withdrawing the enthalpy necessary for the condensation of solvents.

The enthalpy exchange takes place by phase transition of the intermediate refrigerant from the vaporous to the liquid condition via the first heating exchanger and from the liquid to the vaporous condition via the second heat exchanger.

The liquid nitrogen is passed through pipes In the upper part of this lying heat exchanger or of said pressure vessel above said lower part, whereas the gas loaded with solvents is passed in said second heat exchanger through said liquid intermediate refrigerant.

The intermediate refrigerant circulates in said pressure vessel by means of the thermal buoyancy of the vaporized intermediate refrigerant and by down-dropping of the condensed intermediate refrigerant.

In a following separator 11 the condensed solvent is separated from the exhaust gas stream and filled into suitable containers utilizing the existing condensation pressure.

The liquid nitrogen supplied to the cryogenic condenser 9 vaporizes and is fed as a gas stream to the recuperator 8 for cooling purposes.

Additionally the cooled exhaust gas stream from the cryogenic condenser 9, from which the solvent has been separated, is fed to the recuperator 8 as well to aid in cooling the exhaust gas stream from the molecular sieve adsorber 7.

The nitrogen gas stream from the recuperator 8 which is not contaminated by the solvent is released via a valve 12 to the atmosphere or used for further treatments, indicated by the term "inertization" in the FIGURE, namely the use of this clean inert gas as protective gas in the refrigerator shredder to prohibit explosions as result of not preventable sparks.

The condensation temperature and the condensation pressure In the cryogenic condenser 9 are selected in such a way that the required remaining load of the exhaust gas is reached. In many cases, however, the condensation temperature cannot be set to a sufficiently low value, since there is the danger of freezing the solvent and thereby of icing of the heat exchanger in the low temperature condenser 9. In such a case the system cannot be operated continuously.

Therefore the condensation temperature in these cases is set to a value above the melting point of the solvent, so that the exhaust gas exiting the low temperature condenser 9 still contains gaseous solvents which cannot be removed in the separator 11.

To cover these cases the exhaust gas from the recuperator 8 is fed to a second zeolithic molecular sieve adsorber 13 consisting of two zeolithic molecular sieves connected in parallel to ensure a continuous operation.

In this second molecular sieve adsorber 13 the remaining solvents are adsorbed, so that the gas exiting from the molecular sieve adsorber 13 contains only traces of solvents fulfilling the Federal Regulations. Therefore this exhaust gas can be released to the atmosphere or to further processing indicated likewise by the term "inertizatiton" in the FIGURE, for example as a protective gas.

The second molecular sieve adsorber 13 is designed as a temperature-aided pressure swing adsorber utilizing the pressure necessary for the condensation in the cryogenic condenser 9 for adsorbing the solvent. Furthermore the cold exhaust gas from the cryogenic condenser 9 is passed into the adsorber 13, i.e., the adsorption occurs simultaneously under high pressure and low temperature, leading to optimum results.

The desorption of the zeolithic molecular sieve in the adsorber 13 is caused by a pressure decrease and by the introduction of a warmed inert gas stream. The pressure decrease can be created by switching off the desorbing molecular sieve from the high pressure system so that the desorbing molecular sieve reaches atmospheric pressure.

As inert gas stream the purified exhaust gas from the recuperator 8 or preferably pure nitrogen can be used. The warming of the desorption gas is performed in one or several stages in dependence upon the solvent components of the exhaust gas to be purified.

As pure nitrogen the vaporized nitrogen stream having passed the condenser 9 and the recuperator 8 can be employed.

The solvent-loaded desorption gas exiting from the adsorber 13 is fed by the line 14 to the entry side of the system shown in the FIGURE, namely either to the entrance of the precooler 1 or directly to the entrance of the compressor 3 (not shown), thereby circumventing the condensation step for this dry gas in the precooler 1.

As evident from the FIGURE the desorbate gas from the molecular sieve of the first adsorber 7 which is not in the adsorbing phase is likewise led back to the entry of the system, either to the entrance of the precooler 1 or directly to the entrance of the compressor 3 (not shown). This is indicated by the broken line merging with the line 14.

The first adsorber 7 is likewise configured as a temperature-aided pressure swing adsorber which adsorbs at the high pressure obtained by the compressor 3 and desorbs at a lower pressure, for example atmosphere. Desorption is aided by two-stage warming of the desorbing gas, preferably pure nitrogen branched off from the nitrogen passing the condenser 9 and the recuperator 8.

While the temperature of the exhaust gas in the precooler 5 does not suffice for adsorbing the solvents, in the adsorber 7 which is only used for dewatering purposes, there is the risk of co-adsorption of these solvents in the adsorber 7.

Therefore, during the desorbing phase the desorbing sieve of the adsorber 7 is warmed to a first, lower temperature; initiating the desorption of said co-adsorbed solvents, and subsequently to a second, higher temperature causing the desorption of water.

The fine-purification of the gas under high pressure in the cryogenic condenser 9 allows a condensation of essentially all solvent components including R12, so that the following adsorber 13 is only loaded with the necessary amount of solvent.

What is claimed is:

1. A method for purifying solvent-containing gas comprising the steps of:
   a) cryogenically condensing a dewatered pressurized, solvent-containing gas to create condensed components and remaining gas;
   b) separating the condensed components from the remaining gas;
   c) passing the remaining gas through an adsorber to absorbe condensed solvents that remain in said remaining gas;
   d) purging the adsorber with a warmed inert gas stream to desorb condensed solvents thereby creating a desorbed gas stream; and
   e) recycling the desorbed gas stream from said adsorber.

2. The method according to claim 1, wherein prior to said cryogenically condensing step, is a step of compressing the solvent-containing gas to a pressure between 2 and 25 bars.

3. The method according to claim 1, wherein the recycling step is accomplished by combining said desorbed gas stream with said solvent-containing gas prior to the cryogenically condensing step and repeating the steps a-e.

4. The method according to claim 1, characterized in that the adsorber in said passing step is operated under cryogenic conditions at a temperature of less than −20° C.

5. The method according to claim 1, characterized in that the purging step is performed at atmospheric pressure.

6. The method according to claim 1, wherein the cryogenically condensing and passing steps are performed at pressures that are about the same.

7. The method according to claim 1, wherein prior to said cryogenically condensing step, are multiple steps of condensing the solvent-containing gas to create a dewatered solvent-containing gas.

8. The method according to claim 7, wherein produced ice hydrates are removed as particles during at least one of said multiple steps of condensing.

9. The method according to claim 1, wherein prior to said cryogenically condensing step, are multiple steps of condensing and at least one compressing step to create a dewatered, pressurized, solvent-containing gas.

10. The method according to claim 1 wherein said solvent-containing gas is an exhaust gas produced from the step of refrigerator recycling.

11. A system for purifying solvent-containing gas comprising:
    a) a compressor for compressing the gas;
    b) a separator for separating water and/or solvent from the compressed gas;
    c) a cryogenic condenser for condensing the dried, compressed gas;
    d) a separator for removing the condensed solvents from the remaining gas; and
    e) a pressure swing adsorber for adsorbing the remaining condensed solvents wherein the cryogenic condenser is cooled with a liquefied inert gas, and wherein evaporated liquefied inert gas from the cryogenic condenser is used for desorption of said adsorber.

12. The system according to claim 11, wherein a second pressure swing adsorber is disposed between said compressor and said cryogenic condenser.

13. The system according to claim 12, wherein at least one of the two adsorbers comprises at least two zeolithic molecular sieves connected in parallel.

14. The system according to claim 12, wherein a recuperator is disposed both between the second adsorber and the cryogenic condenser and between the cryogenic condenser and the first adsorber.

15. The system according to claim 14, wherein the cryogenic condenser is cooled with a liquefied inert gas, and wherein the evaporated nitrogen from the cryogenic condenser is used to cool the recuperator.

16. The system according to claim 14, wherein the cryogenic condenser is cooled with a liquefied inert gas, and wherein the evaporated nitrogen from the cryogenic condenser is used to desorb the second adsorber.

17. The system according to claim 15, wherein the cryogenic condenser is cooled with a liquefied inert gas, and wherein the evaporated nitrogen from the cryogenic condenser is used to desorb the second adsorber.

* * * * *